Oct. 31, 1950 N. OPOTOW 2,527,647
DENTAL FLASK

Filed Feb. 6, 1947 3 Sheets-Sheet 1

INVENTOR
Nathan Opotow
BY S. Stephen Baker
ATTORNEY

Oct. 31, 1950 N. OPOTOW 2,527,647
DENTAL FLASK

Filed Feb. 6, 1947 3 Sheets-Sheet 2

INVENTOR
Nathan Opotow
BY
J. Stephen Baker
ATTORNEY

Oct. 31, 1950  N. OPOTOW  2,527,647
DENTAL FLASK
Filed Feb. 6, 1947  3 Sheets-Sheet 3
FIG_5_
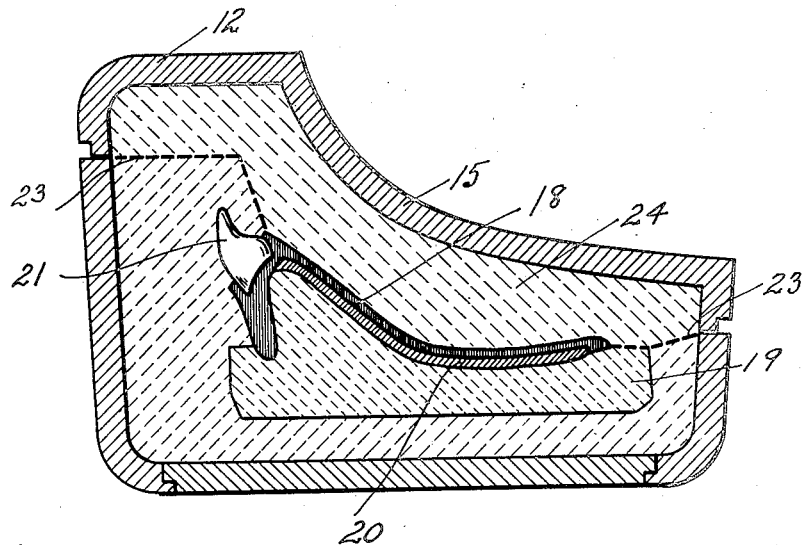
INVENTOR.
Nathan Opotow
BY
S. Stephen Baker
ATTORNEY.

Patented Oct. 31, 1950

2,527,647

UNITED STATES PATENT OFFICE 2,527,647

DENTAL FLASK

Nathan Opotow, New York, N. Y.

Application February 6, 1947, Serial No. 726,864

2 Claims. (Cl. 18—33)

1

This invention relates to dental flasks used by dentists and dental technicians for forming partial or full artificial dentures.

The present application is a continuation in part of my application Serial No. 634,735, filed December 13, 1945, now Patent No. 2,440,910, and of application Serial No. 709,566, filed November 13, 1946, now Patent No. 2,448,115.

As recited in the above mentioned applications, artificial dentures are usually made by investing an upper or lower model of the jaw structure into the lower portion or section of a dental flask together with a waxed-up case representing a prototype of the finished denture. Various steps are then followed, including the substitution of thermoplastic material for the wax of the waxed-up case. Such thermoplastic material takes the form of any desirable acrylate as used in the art or any other suitable denture material and after applying pressure to distribute the denture material properly, the flask is processed by heat in order to cure the denture material.

The conventional flask takes the form of a cylindrical section wherein the denture is generally disposed in a central portion thereof. However, the denture itself is not cylindrical but irregular in form. Accordingly, it has been found that the degree of curing of the denture material varies according to the distance of specific portions thereof from the source of heat. For example, when processing an upper jaw artificial denture, the center or palate thereof would be subject to a different degree of heat than the gum portions. The various degrees of curing heat acting upon different portions of the denture produce structural irregularities and variations of density therein. Such irregularities are undesirable in the finished product.

Bearing the foregoing in mind, it is an object of the instant invention to so form a dental flask that the artificial denture is subjected to a uniform degree of heat throughout its structure. Specifically the flask is so formed that it follows the general shape of the denture itself in a large portion thereof so that the distances which the heat must traverse to reach the denture are rendered uniform. It is also an object to adapt the improvement to various types of dental flasks as described and as claimed in the above mentioned patent applications.

Other objects of my invention will be apparent from the following description, it being understood that the above general statements of the objects of my invention are intended to describe and not limit it in any manner.

2

Referring to the drawings:

Fig. 5 is a cross sectional view of the flask of the modified embodiment.

Figure 1:
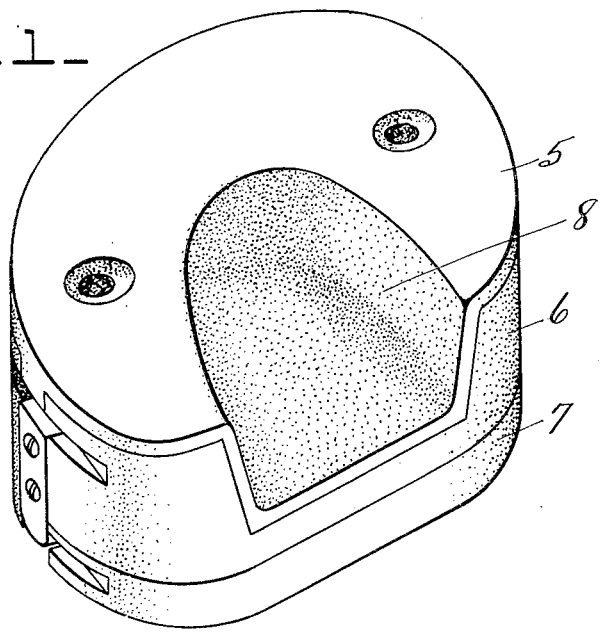
Fig. 1 is a perspective view of a dental flask constructed according to the instant invention.
Figure 2:
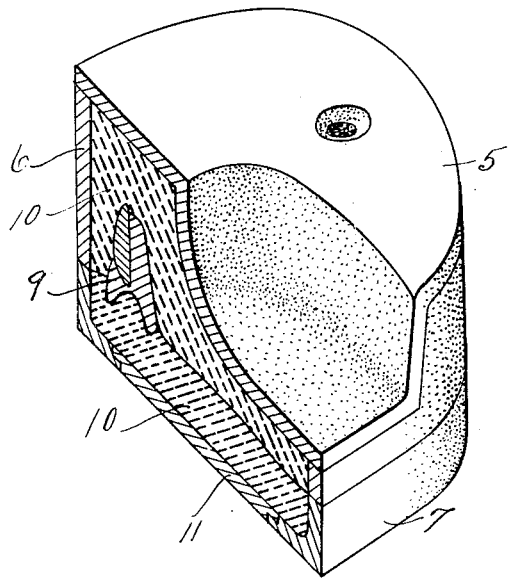
Fig. 2 is a cross sectional view thereof in perspective and illustrating the internal disposition of the denture.

Referring to Figs. 1 and 2, the flask shown therein comprises the cover section 5, the intermediate section 6 and the base 7. The cover section 5 and the base 7 respectively comprise and form the upper and lower ends or end walls of the flask. In accordance with the present invention, cover 5 is formed with an oval depression 8 the curvature of which generally follows that of a palate. Intermediate section 6 is suitably cut away along a rear wall thereof so as to accommodate the outer edges of depression 8 and cooperate therewith in forming a completely enclosed flask. Intermediate section 6 provides the flask with enclosing side walls, that portion of section 6 which is cut away being designated as the rear side wall, while the opposite side is the front side wall. The front and rear side walls are so designated in order to conform to the conventional disposition of a denture within the flask as will be hereinafter described.

Referring to Fig. 2, the denture 9 is shown disposed within the flask and maintained therein by investment material 10. Such investment material may be plaster of Paris or any like substance. The lower denture 9 is formed of the acrylic material above mentioned and, according to the required procedure, the flask in the form shown is subjected to a high temperature for curing the composition used in the denture. As will be recognized, such heat is applied generally by maintaining the flask in boiling water while it is held in a compensating spring press. The oval depression 8 is instrumental in conveying the curing heat close to the denture within the flask. In prior devices, the heat was required to traverse a substantial thickness of plaster of Paris and results were variable. In the instant invention, however, a considerable portion of the plaster of Paris is eliminated since the depression 8 effectively brings the cover section in close proximity to the denture whereby a relatively narrow layer of investment material need be traversed by the heat, and the depression extends along a curve substantially parallel to the invested denture.

The construction is further of great advantage since the oval or arcuate shape of depression 8 is such as to conform generally to the shape of the denture. Thus, the upper or wall portion of depression 8 is in adjacent relation to the gum ridge portion of the denture while the floor of the depression extends along the palate portion in the case of an upper denture or past the gum margins of a lower denture. In either event, the upper or wall portion of depression 8 in cooperation with the crescent-shaped, flat cover section area and the adjacent wall of the intermediate section 6 forms an arcuate chamber which corresponds to the shape of the gum ridge disposition of denture material. Accordingly, the transmission of heat from the dental flask itself is uniform around such gum ridge portion and variations in ultimate density or curing degrees are at least minimized, if not eliminated.

The remaining elements of the flask described are conventional, as will be recognized, the base 7 including a conventional knock-out block 11 to facilitate removal of the finished denture.

Figure 3:
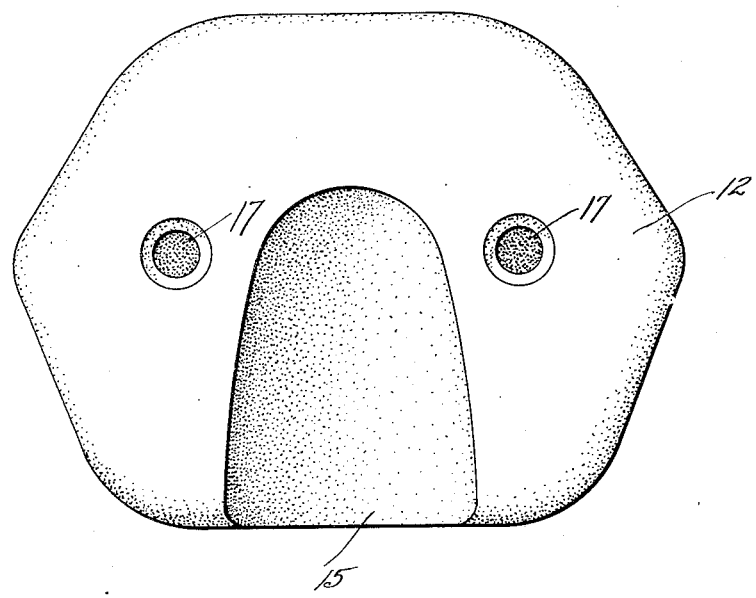
Fig. 3 is a top plan view of a modified embodiment.
Figure 4:
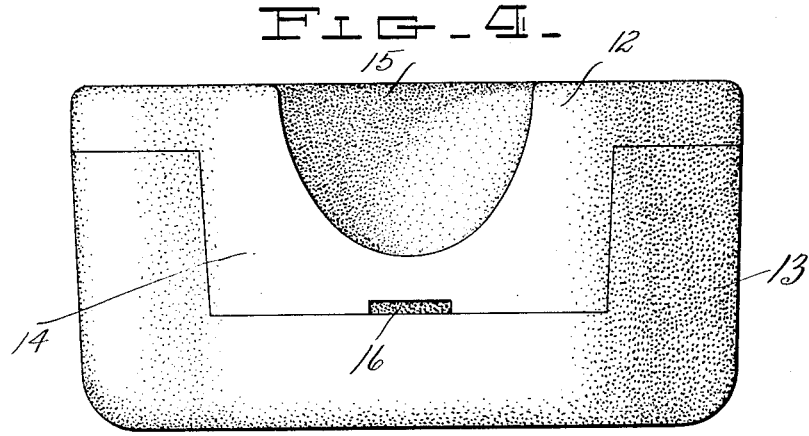
Fig. 4 is a rear elevational view of the flask shown in Fig. 3.

Referring to Figs. 3 and 4, the invention herein is shown as adapted to a two-piece flask used in the so-called banking procedures. Such procedures are practiced generally by different forms of flasks and a specific procedure has been set forth in the above mentioned patent applications.

The two-piece flask comprises the upper section 12 and the complementary lower section 13. Section 12 is formed with a depending flange 14 whereby a mound of plaster may be maintained jointly by the cover section and flange which is useful in the banking method of processing dentures as described in the prior applications. In accordance with the instant invention, cover 12 and flange 14 are shaped to provide the oval depression 15 serving the same functions as in the previous embodiment. The same advantages will accrue as set forth hereinabove.

In the second preferred embodiment, the indentation 16 serves merely to facilitate separation of the flask sections by an appropriate tool, and a knock-out block, not shown, may be provided. Openings 17 function as gripping means for the set plaster as is usual in most types of dental flasks.

The flask of either embodiment is fabricated of metal as is conventional so that the high heat conductivity thereof serves to transmit applied heat to the denture. By forming the depression described, the material of the flask is caused to penetrate a substantial portion of the investment material which is of relatively far poorer heat conductivity. Thus, by eliminating a considerable thickness of such investment material, the insulation against heat transmission is reduced.

In Fig. 5 is shown the application of the flask as constructed according to the second embodiment and accommodating an upper denture. The substantially parallel paths of the depression and the wax 18 representing the disposition of the denture material are apparent. The utility and assembly of the device as illustrated in Fig. 5 will be obvious to those skilled in the art. The flask is shown in Fig. 5 before the denture material is applied. It will be recognized that the subsequent procedure substitutes denture material for the wax 18 and baseplate 20. Briefly, the artificial stone cast 19 together with the baseplate 20, wax 18 and teeth 21 are invested in the plaster 22 which is caused to cover the waxed-up case up to the dotted lines 23. A petroleum jelly or other oily substance is then applied over the exposed plaster as delineated by the dotted line 23 and over the wax 18 whereupon the plaster 24 and the cover 12 are applied to close the flask. The wax is then boiled out, the cover 12 is removed and the baseplate 20 is stripped away as is well understood. Thermoplastic material is then substituted as hereinabove set forth and the flask is processed by heat in order to cure the thermoplastic material. It is at this time that the wall of depression 15 uniformly conveys heat to substantially all portions of the denture for the purposes described above.

It will be observed that in both embodiments the depression is off-set, extending as it does into the rear side wall of the flask which has a U-shaped cut-out to accommodate it. In the first embodiment, however, the cut away portion of intermediate section 6 conforms in shape to that of the edge of the depression whereas in the second embodiment the rectangular flange 14 depends integrally from depression 15 and the rear side wall of the flask is shaped rectangularly to complement it. Referring to Figs. 2 and 5, the teeth or front of the denture are adjacent the side wall that is opposite to the U-shaped cut-out. It is for this reason that the flask side wall thus opposite is referred to as the front side wall while that with the cutout is referred to as the rear side wall.

I have shown a preferred embodiment of my invention, but it is obvious that numerous changes and omissions may be made therefrom without departing from its spirit. For example, the depression need not be hollow on its upper surface but may take the form of a projection on the lower surface of the cover. Similarly, in the case of a lower denture as illustrated in Fig. 2, it is unnecessary to form the flask with the rear end as shown, the rear end as viewed in Figs. 1 and 2 substantially facing the observer. Manifestly, if a flask is only to accommodate lower dentures and not upper dentures, it need only be U-shaped where the rear side wall conforms to the gum ridge portion. Such a flask, of course, would not only be U-shaped as regards the configuration of the lower denture, but would be U-shaped in cross section to conform to the cross-sectional shape of the lower denture as illustrated in Fig. 2. Therefore, it is intended that the invention be limited only by the scope of the appended claims.

I claim:

1. A dental flask having a base, a cover, and side walls for maintaining an artificial denture in investment material, said flask being of metallic material and being adapted to transmit curing heat through said investment material to said denture, said flask having an arcuate depression formed in the cover thereof and extending into a side wall so as to be substantially palate-shaped and said cover being formed with a rear, integral depending portion, said side wall being cut away to receive said depending portion.

2. A dental flask having a base, a cover, and side walls for maintaining an artificial denture in investment material, said flask being of metallic material and being adapted to transmit curing heat through said investment material to said denture, said flask having an arcuate depression formed in the cover thereof and extending into a side wall so as to be substantially palate-shaped, a planar, substantially rectangular portion depending further from the side wall end of said arcuate depression, said side wall having a rectangular cut-out therein complementary in shape to said depending rectangular portion so as to receive the same.

NATHAN OPOTOW.

REFERENCES CITED

The following references are of record in the file of this patent:

UNITED STATES PATENTS

| Number | Name | Date |
|---|---|---|
| 1,115,779 | Brunton | Nov. 3, 1914 |
| 1,875,596 | Hazeltine | Sept. 6, 1932 |
| 1,949,227 | Weichert | Feb. 27, 1934 |
| 2,117,086 | Feminella | May 10, 1938 |
| 2,188,415 | Malsch | Jan. 30, 1940 |
| 2,368,721 | Moskey | Feb. 6, 1945 |
| 2,378,633 | House | June 19, 1945 |